Patented May 31, 1927.

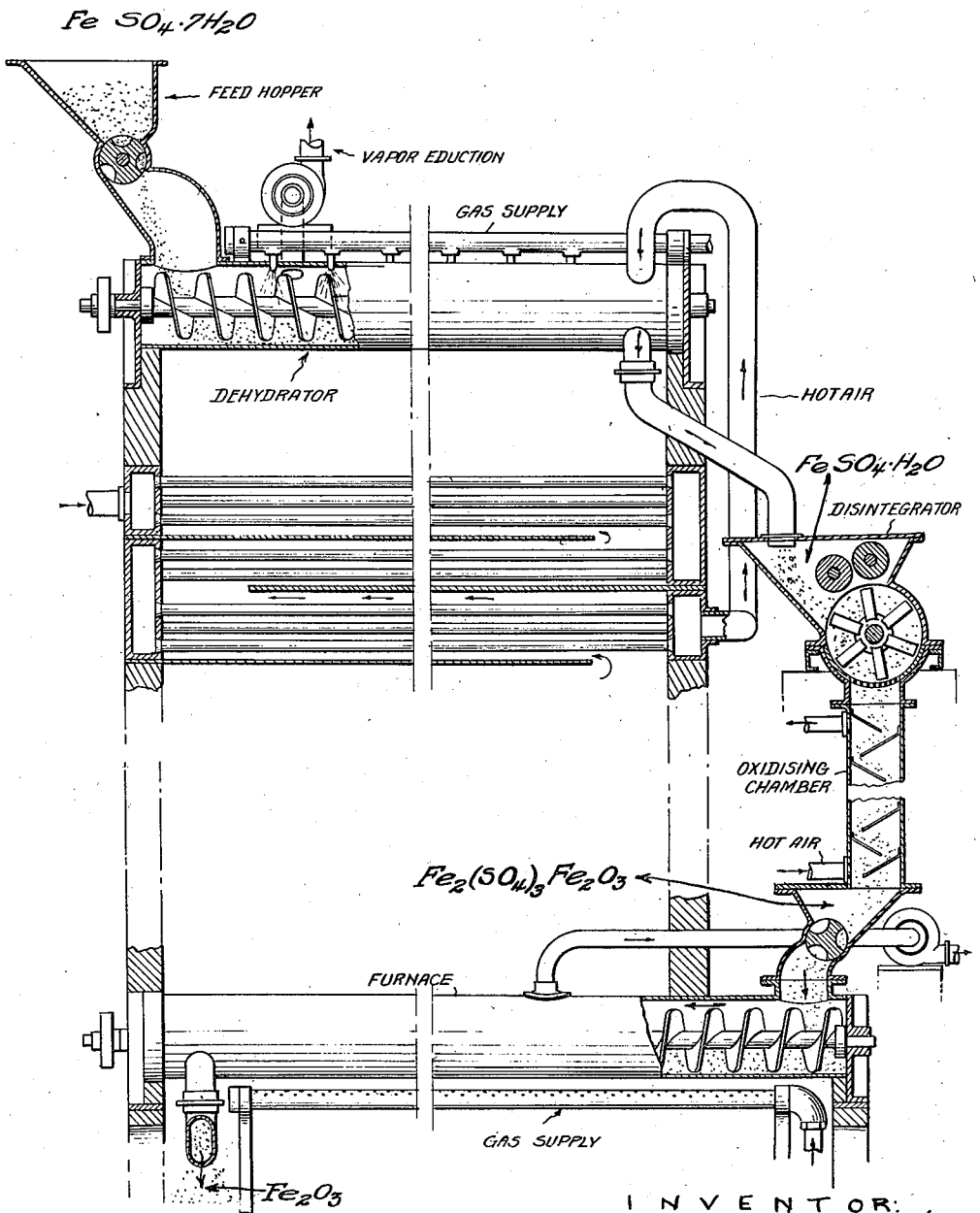

1,630,881

UNITED STATES PATENT OFFICE.

DEMETRIUS GEORGE ZALOCOSTAS, DECEASED, LATE OF SYDNEY, NEW SOUTH WALES, AUSTRALIA; BY ANDRIANNE ZALOCOSTAS, EXECUTRIX, AND JOHN VELISSAROPULOS, EXECUTOR, OF SYDNEY, AUSTRALIA.

MANUFACTURE OF FERRIC OXIDE.

Application filed March 28, 1925, Serial No. 19,008, and in Australia April 16, 1924.

It has been already suggested that ferrous sulphate (heptahydrate) may be simultaneously dehydrated and oxidized while being moved through a chamber which is externally heated and which is traversed by a counter current of hot air, and it has been asserted that in this step of the process, which precedes roasting, a friable product (monohydrate sulphate) is obtained which is readily removable through the apparatus during the process of treatment. In practice, however, ferrous sulphate thus treated forms into a concrete like cake which clogs the apparatus and causes mechanical difficulties so that commercial operation of the process is rendered impracticable.

The heptahydrate sulphate ($FeSO_4.7H_2O$) melts at about 64° C. If its temperature be slowly raised above that point in a vaporous atmosphere, the melting crystals immediately concrete and the concreted mass thus formed can be broken and removed out of the apparatus in which the concreting occurs only with much difficulty. This concreted product is not readily permeable to heat, as it still contains much water. The interior parts of it particularly are substantially inaccessible to air and further dehydration and oxidation are therefore not readily practicable.

In the known process the heptahydrate sulphate on entering the dehydrating chamber is exposed at first to a moderate heat and the atmosphere surrounding it is moist. The dehydrator is heated externally and more or less uniformly from end to end, and the material suffers treatment under low temperature conditions, as much of the heat which is applied to the chamber is absorbed in vaporizing the liberated water and is thus rendered latent and is not available for raising the temperature.

According to the present invention the heptahydrate sulphate crystals are submitted to treatment which inhibits the concreting action which has been described. The crystals are suddenly submitted on entry into the apparatus to the action of heat applied to them in sufficient quantity and at a sufficiently high temperature to vaporize off all the liberated water, and this condition is maintained throughout this step of the treatment. Owing to the immediate vaporization of the liberated water the transition point at which melting occurs is passed very quickly and the heptahydrate is converted into lower hydrates without intermediately liquefying. The product thus obtained is equal in bulk to the original crystals though of less weight and is a readily friable porous material of a spongy nature which can be readily crushed and which in consequence of its physical condition may be successfully submitted immediately to further heat treatment without risk of cementing it.

In carrying out the invention, therefore, the heptahydrate ferrous sulphate crystals are moved through a dehydrating chamber and therein submitted throughout their movement in that chamber to the direct action of gas flames playing upon them, the heat value of the flames being sufficient to rapidly bring up the temperature of the crystals substantially above 64° C. and to effect immediate vaporization of the liberated water of crystallization, and the vapors are educted rapidly. This dehydration step is continued for a sufficiently long time to ensure the production of a product which contains only one molecule of water ($FeSo_4.H_2O$), and this material is immediately passed through an appropriate mill, as for instance a disintegrator, and is thence passed directly into an oxidizing chamber in which it is treated with hot air brought into intimate contact with its surfaces as by showering the crushed material through it. In this step of the treatment conversion to basic sulphate is effected and water is eliminated as vapor according to the formula:—

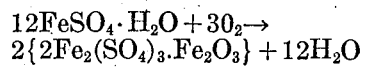

$$12FeSO_4 \cdot H_2O + 3O_2 \rightarrow 2\{2Fe_2(SO_4)_3.Fe_2O_3\} + 12H_2O$$

Oxidation takes place in part in the dehydrator, in part in the mill, and in part in the oxidizing chamber, the relative degree of oxidation in each of these stages varying according to circumstances. The function of the oxidizing chamber is to substantially complete the oxidation which has been partially effected in the preceding stages, and its work is promoted, as also is the work of the roasting furnace in a later stage, by the milling of the product preceding its treatment in the oxidizing chamber, in which milling the particles are broken to fine granular condition and agitated in contact with air. From the oxidizing chamber the product goes immediately to the roasting furnace in which its temperature is raised and maintained for a sufficiently long time at a point at which conversion of the basic sulphate to ferric oxide is effected with liberation of sulphur oxides, the ferric oxide being brought to the desired color condition by controlling the degree of temperature and the period of treatment.

Ordinarily, ferrous sulphate when heat treated breaks down into ferric oxide and equal molecular quantities of sulphur dioxide and sulphur trioxide. The trioxide only is immediately recoverable as sulphuric acid and the dioxide is lost unless submitted to treatment for the production of sulphurous acid or to other known treatment for ultimate conversion to sulphuric acid, involving augmented cost. According to the method of the present invention, the whole of the sulphate is liberated as trioxide and is recovered as sulphuric acid in an absorber according to the formula—

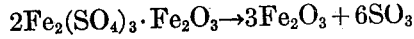
$$2Fe_2(SO_4)_3 \cdot Fe_2O_3 \rightarrow 3Fe_2O_3 + 6SO_3$$

The drawings accompanying and forming part of this specification illustrate in sectional side elevation, an apparatus adapted for carrying out the present invention.

The particular mechanical constructions of the dehydrating chamber, the oxidizing chamber, and the roasting furnace are not material to the present invention. The dehydrator may take the form of a rotary flue fitted with a helical conveyor, a drag conveyor, a rake conveyor, or other such device which is mechanically appropriate for moving and agitating the crystals continuously during their transfer from the feed to the delivery end of it, throughout which transfer they are directly acted upon by gas flames. An assembly of gas burners is fitted within this chamber and arranged to direct their flames immediately onto the crystals under treatment, care being taken to provide an adequate supply of heat by these means throughout the treatment to hold the material always at a temperature substantially above 64° C. and to effect immediate vaporization of liberated water. This dehydrating chamber is also fitted with vapor educting means, such, for instance, as a centrifugal exhaust fan. The oxidizing chamber may be a rotary flue fitted with a helical conveyor, with or without paddles or other mechanical means for agitating the material progressing through it and exposing the surfaces of that material intimately to hot air, a current of which is caused to flow through the chamber, the temperature and time of roasting being controlled according to the color finish required in the product. The roasting furnace may be constructed according to any known design of furnace commonly used for such purposes.

What is claimed is:—

The herein described process of manufacturing ferric oxide from ferrous sulphate (heptahydrate) crystals, which consists in traversing a layer of ferrous sulphate crystals through a dehydrating chamber provided with gas burners arranged to project gas flames over the surface of the crystals, proportioning the heat so applied to the crystals to vaporize water of crystallization as rapidly as it is liberated therefrom, and to maintain a temperature above 64° C. in said chamber, educting the vapor as rapidly as it is formed, thereby producing a freely friable and substantially completely dehydrated product, grinding said product, submitting the ground product to oxidizing treatment, and finally roasting the dehydrated oxidized ground product.

In testimony whereof we affix our signatures.

ANDRIANNE ZALOCOSTAS,
*Executrix.*
JOHN VELISSAROPULOS,
*Executor.*